UNITED STATES PATENT OFFICE.

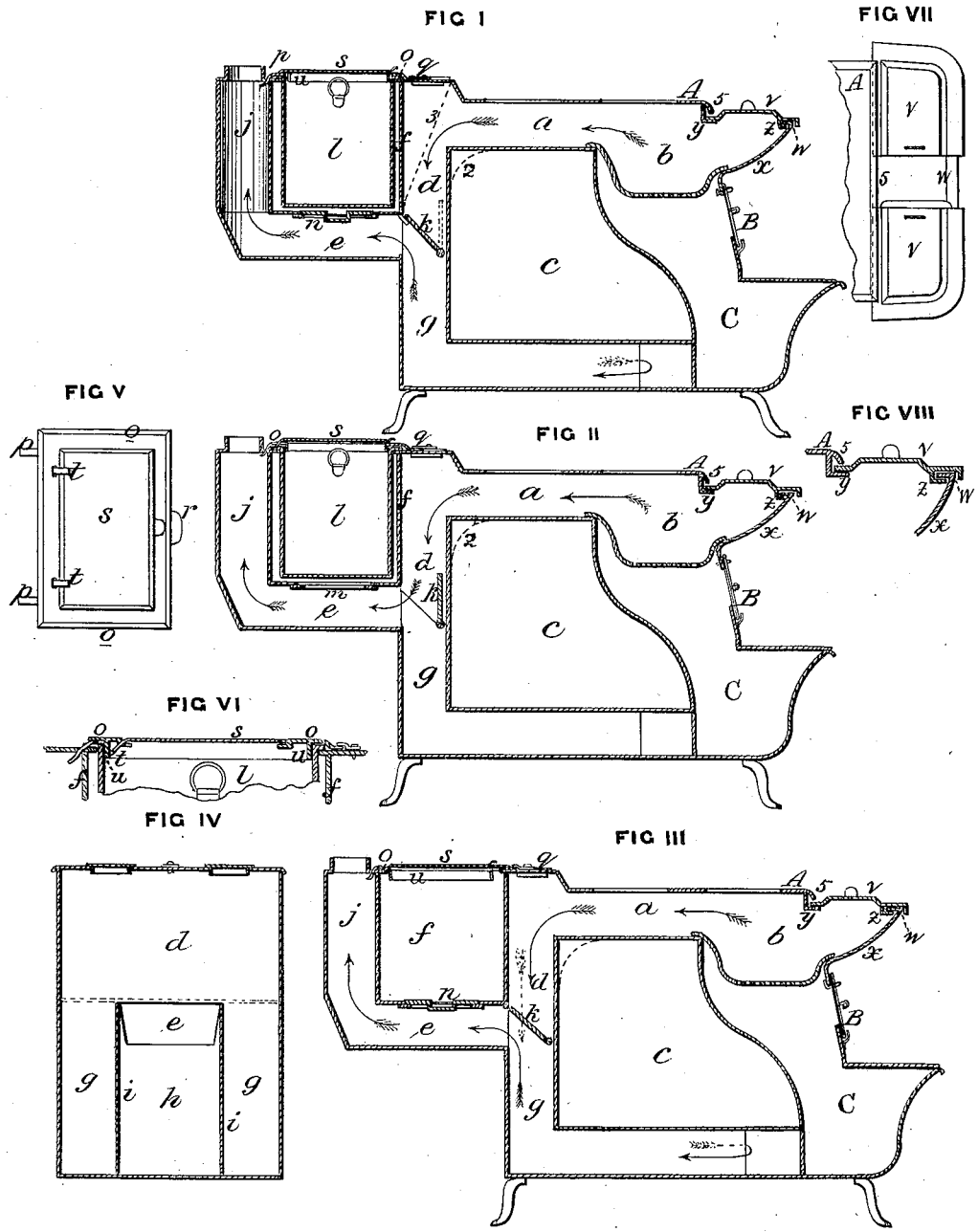

MAURICE D. SEWARD, OF NORMAL, ILLINOIS.

IMPROVEMENT IN COOKING-STOVES.

Specification forming part of Letters Patent No. 159,225, dated January 26, 1875; application filed December 10, 1874.

*To all whom it may concern:*

Be it known that I, MAURICE D. SEWARD, of Normal, in the county of McLean and State of Illinois, have invented certain new and useful Improvements in Cooking-Stoves; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to cook-stoves having a rear reservoir for water; and one of the main features of my improvement is to isolate the reservoir from the heating-flues, and so control such isolation as to obtain, when desired, a direct heating of the reservoir from the said flues, or heat it only by radiation. In effecting this desirable object the reservoir is supported within a box-chamber on the rear of the stove, and combined with a removable plate, whereby, when removed, to open the direct communication of the central cross-flue with the reservoir-receptacle, and heat the reservoir by the direct contact of the heat upon its bottom and sides, or heating the reservoir through said plate when closing the bottom and less heat is required, and in this way, not only regulate the heat of the reservoir by the removable bottom-plate, but protect the reservoir from burning out when the water is low.

In the combination of the box-chamber, with its removable bottom plate, cross bottom flue, and removable reservoir, I obtain the very important advantages of converting the reservoir box-chamber into a warming or cooking oven by lifting out the reservoir, closing the bottom flue opening in the box-chamber, and putting on the covers of the latter.

The combination with a removable reservoir and a removable bottom plate, in the inclosing-box of said reservoir, of a removable open-top flanged frame, forms another feature of my invention, the object and advantage whereof is to render the bottom plate easily accessible for removal and replacement, when desired, and to close the top joints of the reservoir; and in connection with these removable elements so combined, the combination therewith of a removable lid or cover for the reservoir proper, whereby the frame and its cover are made separately removable to admit of their being handled with facility, when it is desired to take out the reservoir to either remove or put the bottom plate in place, in regulating the heat, or for other purpose.

My invention further consists in the combination, with the reservoir inclosing box-chamber, provided with a removable bottom plate, of a sheet diving-flue, extending from the top of the oven, in front of the reservoir-box, down to the inner lower part thereof, two flue-strips extending from the bottom of the reservoir-box to the bottom of the flue-space, a rolling damper at the top of the central ascending flue, and a cross central flue, with which the bottom plate of the reservoir-box is opened and closed to control the heat upon said reservoir, whereby, when the damper is open and the bottom plate of the box removed, the products of combustion pass across the bottom of the reservoir and directly contact therewith to obtain the greatest heat, or controlling the heat by cutting off the direct draft with the central cross-flue.

Another improvement consists in the combination, with divided laterally-sliding feed-doors, of a front projecting-plate, having a front top bearing for the feed-doors arranged away from the fire-chamber, and nearly in line with the top plate, and in a position to overhang the hearth and prevent ashes and coal falling thereon, and the issuing of smoke and gases while feeding. By this construction and combination the inner guide-bearing for the doors is formed by a separate plate, or may be cast on the front of the stove, if desired, and the stop-clips that control and keep the doors in place are arranged at the outer edge of said doors, and remote from the fire, to keep them in free working condition.

In the accompanying drawings, Figure 1 represents a vertical longitudinal section of a cook-stove embracing my invention, and in which the reservoir is shown isolated from all direct draft and heat; Fig. 2, a similar view, with the bottom plate of the reservoir box-chamber removed and the sheet-flue damper open to expose the reservoir to the direct action of the heat; Fig. 3, a similar view, showing the reservoir box-chamber adapted for oven purposes; Fig. 4, a cross-section in the line of the sheet-flue; Fig. 5, a top view of the combined removable top frame and cover for the reservoir; and Fig. 6, an enlarged section thereof.

The top flue $a$ leads from the fire-chamber $b$, over the oven $c$, down a sheet-flue, $d$, and into a cross-flue, $e$, of a reservoir box-chamber, $f$, or beneath the oven, which has the usual bottom return-flues. The box-chamber $f$ extends from the rear side of the stove and forms one side of the upper portion of the rear sheet-flue $d$, while the lower portion of said flue is divided from the bottom of the box-chamber $f$ into two side descending flues, $g\ g$, and a central ascending flue, $h$, by means of strips $i\ i$, at the upper ends of which the central flue, $h$, terminates, and is combined with the horizontal cross central flue $e$, formed in the bottom of the box-chamber, and leading to the exit-flue $j$ in the rear of said box-chamber. The upper ends of the flue-strips $i\ i$ terminate at the lower side of the box-chamber $f$, and incline downward from that point, and a damper, $k$, is secured upon a horizontal rod, so as to be shut down on the ends of the strips, or to be turned back against the rear side of the oven, as may be desired. When in this latter position, as shown in Fig. 1, the products of combustion pass direct from the sheet flue $d$, through the box-chamber flue $e$, heating the reservoir either directly or by radiation.

When said damper $k$ is turned back upon the flue-strips $i$, as stated, and shown in Figs. 1 and 3, the products of combustion descend through the side flues, $g$, pass under the oven $c$, and, returning through the center flue, $h$, to the damper, pass out through the box-chamber flue $e$, heating the box-chamber in the same manner as by the direct draft from the sheet flue.

The box-chamber $f$ forms the receptacle for the reservoir $l$, and incloses its bottom and sides, and in order to obtain the direct heat from the box-chamber flue $e$ upon the bottom of the reservoir, an opening, $m$, Fig. 2, is made in the bottom of the box-chamber, communicating directly with the central cross-flue, $e$, and I provide said opening $m$ with a removable bottom plate, $n$, which, when in place, as shown in Figs. 1 and 3, causes said reservoir to be heated by radiation, and when removed, as shown in Fig. 2, exposes the bottom of the reservoir to the direct heat from the box-chamber flue $e$, to obtain the greatest heat when the water in the reservoir $l$ is desired to be heated quickly.

The bottom opening, $m$, may be the full width of the reservoir, or only a portion thereof, as may be desired.

To remove or replace the bottom plate, $n$, the reservoir $l$ is lifted out, and to allow this to be conveniently done I combine, with the box-chamber $f$, a removable open frame, $o$, held in place by two hooks, $p\ p$, on the back edge thereof, fitting into openings in the top plate of said box-chamber, to allow it to be easily removed and again put in place and secured by a button, $q$, turned over a lip, $r$, on the front edge of said frame. A separate cover or top, $s$, for the reservoir, is combined with this open frame $o$, so as to be raised for access to the reservoir, when desired, and it is also provided with hooks $t$ on its rear edge, fitting into corresponding openings in the frame $o$, and which, while serving as hinges to allow it to be opened, also admit of its being removed separately from the open frame. The open frame is provided with flanges $u$, which, when the frame is in place, fit closely into the reservoir $l$, and prevent the steam from escaping from the joints and cause the condensation to fall back into the reservoir.

To convert the box-chamber $f$ into a warming-oven the reservoir $l$ is removed, as shown in Fig. 3, the bottom plate, $n$, put in place, and the combined covers $o\ s$ fitted upon the box-chamber, so that cooked articles of food may be kept therein, in which case the rolling damper $k$ is closed with the cross-flue $e$, and the draft is made to pass beneath the main oven $c$ before reaching the cross central flue. By this construction and arrangement, the box-chamber $f$ may be also used as a supplemental cooking-oven, in which case the damper $k$ must be turned forward to obtain the direct heat upon the front and bottom plates of said box-chamber.

By thus combining a removable reservoir with an inclosing chamber the reservoir may be made of sheet metal, and, whether it is used or not, the operation of the stove is not affected.

The back plate of the oven may be curved at the top, as shown by dotted lines 2, in which case the back plate of the stove may also be curved or inclined, as shown by dotted lines 3 in Fig. 1, and the box-chamber correspondingly widened at the top, while the curved sides assist the draft of the sheet flue.

When this construction is adopted, the oven-plate should be provided with cast triangular projecting plates at each upper corner to close the openings that would otherwise be left at the upper rear corners of the oven-doors.

The feed-doors $v$ of the stove are divided, and open and close by a lateral movement, as shown in Fig. 7, which is a top view. I do not claim, however, such feature irrespective of the manner by which they are supported and held in position. They are arranged near the top of the stove, and supported out from the front thereof by a front bearing, $w$, upon an upwardly-inclining front projecting plate, $x$, said bearing $w$ being formed by an inward-projecting ledge, while the bearing for the rear edges of the doors is formed by a ledge or angle-plate, $y$, on the under side of the top plate A, and are held thereon by the flange on under side of projecting edge 5 of the top plate, while near the front edges the doors are provided on the under sides with guide-clips $z$, extending beneath the inward-projecting bearing-ledge, $w$, so that the divided doors are held upon bearings, with the controlling guide-clips $t$ some distance from the heat of the fire-chamber, as shown clearly in Fig. 8, where they are less liable to be affected by the expansion of the metal, and, being arranged at the outer corners of the doors, serve to keep the latter from being drawn out of their guides, the object being to keep the sliding doors free from binding, and prevent ashes and dust from falling upon the hearth, and the smoke and gases from puffing out into the room in replenishing the fire with coal.

In divided feed-doors, as heretofore arranged, more or less difficulty is experienced from their liability to bind, by reason of their guide-bearings being upon the front plate of the fire-chamber, and the doors being set upon said front plate either vertically or inclined, causes the accumulating ashes to fall onto the hearth when the doors are opened, this result being incident not only to slide-doors, but to swing and drop doors. By bringing out the front plate $x$ of the stove below the feed-opening, and supporting the feed-doors $v$ in positions thereon, not only avoids the objections stated, but gives advantage in convenience for operating the doors and feeding the fuel. The front of the stove below the feed-doors is brought forward sufficiently to receive the draft drop-door B, which can be turned down to a horizontal position, when desired, without danger of the ashes from the grate falling out. The stove is provided with the usual appliances and ash-pit C, to render it complete.

Among the advantages of my invention I may mention that the reservoir, being inclosed within the box-chamber, prevents its sides from being burned out when the water is low; the direct heat being applied to the bottom of the reservoir, the water heats much more rapidly, and a very small quantity of water will prevent the bottom from burning out; the removable bottom plate of the box-chamber, while serving to control the direct heat upon the reservoir, and converting its receiving-chamber into a cooking or warming oven, also affords facility for cleaning out the central cross-flue and the bottom plate can be quickly removed without interfering with the operation of the stove; the water is heated rapidly by either direct or return draft; the single-roll damper renders the working of the stove simple and easily understood; the sheet-flue increases the draft, heating both the oven and the reservoir alike by the diffusion of the heat through the entire flue-space above the dividing-strips. Instead of the damper shutting down on top of the flue-strips, it may close up on flanges cast on the sides of the strips near their tops.

I claim—

1. The combination of a removable water-reservoir, $l$, arranged outside of and at the rear of the stove within an inclosing-box, $f$, and a removable bottom, $n$, arranged to open and close the communication of said box $f$ with a cross-heating flue, $e$, substantially as herein set forth.

2. The combination, with the removable water-reservoir $l$ and the box-chamber $f$, of a removable bottom plate, $n$, and the central cross and sheet flues $e\ d$ of said box-chamber, substantially as herein set forth.

3. The combination, in a cooking-stove, of the removable water-reservoir $l$, the box-chamber $f$, its removable bottom plate, $n$, the sheet and cross-flues $d\ e$, and the removable open-top flanged frame $o$ for said reservoir, substantially as and for the purpose herein set forth.

4. The combination, in a cook-stove having a removable reservoir inclosed within a box-chamber, and a removable open-top flanged frame, $o$, for said reservoir, as described, of a removable cover or reservoir-top, $s$, substantially as herein set forth.

5. The combination, with the heating and draft-flues $a\ d\ e$, and the damper $k$, and the removable bottom $n$ of a cook-stove, of a convertible receptacle, $f$, for the water-reservoir, and a cooking and warming oven, substantially as herein set forth.

6. The combination, in a cook-stove, of the reservoir-inclosing box-chamber $f$, having a removable bottom plate, $n$, the sheet diving-flue $d$ in front of said box-chamber, the flue-strips $i\ i$ below said sheet-flue, and the rolling damper $k$, for the central ascending flue, $h$, with the bottom central cross-flue, $e$, of said box-chamber, substantially as and for the purpose set forth.

7. The combination, with the divided laterally-sliding feed-doors $v$, of the front-projecting plate, $x$, provided with an upper front bearing, $w$, for said doors, substantially as and to obtain the advantages stated.

8. The combination, with the divided laterally-sliding feed-doors $v$, provided with the guide-clips $z$ at their outer edges, of inner and outer bearings $w\ y$ for said doors, arranged in front of and near the top of the stove, whereby the outer holding guide-bearings are carried away from the fire chamber, for the purpose herein set forth.

In testimony that I claim the foregoing as my own I have affixed my signature in presence of two witnesses.

MAURICE D. SEWARD.

Witnesses:
W. H. WINEGARDNER,
W. P. BROPHY.